US006823391B1

(12) United States Patent
Deen et al.

(10) Patent No.: US 6,823,391 B1
(45) Date of Patent: Nov. 23, 2004

(54) ROUTING CLIENT REQUESTS TO BACK-END SERVERS

(75) Inventors: Brian Deen, North Bend, WA (US); Alex Hopmann, Seattle, WA (US); Joel Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 09/679,720

(22) Filed: Oct. 4, 2000

(51) Int. Cl.$^7$ .......................... G06F 15/16; G06F 17/30; G06F 9/46
(52) U.S. Cl. .......................... 709/229; 707/10; 718/105
(58) Field of Search ....................... 707/10, 4; 709/218, 709/219, 224, 331, 229; 718/105

(56) References Cited

U.S. PATENT DOCUMENTS

| | | | | |
|---|---|---|---|---|
| 5,940,289 A | * | 8/1999 | Iwata et al. | 700/2 |
| 5,941,947 A | * | 8/1999 | Brown et al. | 709/225 |
| 6,101,495 A | * | 8/2000 | Tsuchida et al. | 707/4 |
| 6,161,104 A | * | 12/2000 | Stakutis et al. | 707/10 |
| 6,272,492 B1 | * | 8/2001 | Kay | 707/10 |
| 6,286,047 B1 | * | 9/2001 | Ramanathan et al. | 709/224 |
| 6,339,423 B1 | * | 1/2002 | Sampson et al. | 345/854 |
| 6,453,353 B1 | * | 9/2002 | Win et al. | 709/229 |
| 6,609,159 B1 | * | 8/2003 | Dukach et al. | 709/331 |
| 6,633,311 B1 | * | 10/2003 | Douvikas et al. | 345/731 |

* cited by examiner

Primary Examiner—Marc D. Thompson
Assistant Examiner—M. Delgado
(74) Attorney, Agent, or Firm—Workman Nydegger

(57) ABSTRACT

Methods and computer program products for using a front-end server to access content stored on one or more back-end servers. The front-end server receives requests for content from client systems. Back-end servers store the content, but to the client system, it appears as if the front-end server is the content's source. Upon receiving the request, the front-end server checks the validity of the request and examines a global catalog that dynamically maps client system requests to the back-end server or servers that store the requested content. In some circumstances, the content will be stored at a single back-end server and the front-end server directs the request to that server. Alternatively, a list of back-end servers storing the requested content may be generated. If so, the front-end then uses an authentication token as a key to a hash operation that is performed on the list and a single server that is capable of satisfying the request for content is identified. A given request and authentication token always identify the same server if the list of servers available for providing the requested content remains the same. The front-end server provides a single source for content requests so that client systems are not required to alter requests or invalidate local caches when content is moved from one back-end server to another. The front-end server also provides an additional level of security for back-end servers.

40 Claims, 6 Drawing Sheets

ROUTING CLIENT REQUESTS TO BACK-END SERVERS

RELATED APPLICATIONS

The following co-pending applications, which are filed the same day as this application, are hereby incorporated by reference: U.S. application Ser. No. 09/680,120, entitled "Selecting a Server to Service Client Requests," and U.S. application Ser. No. 09/679,716, entitled "Transparently Redirecting Client Requests for Content."

BACKGROUND OF THE INVENTION

1. The Field of the Invention

The present invention relates to accessing content stored on a server. More specifically, the present invention relates to methods and computer program products for using a front-end server to access content stored on one or more back-end servers.

2. The Prior State of the Art

Day by day, the amount of content available through electronic sources grows to ever increasing proportions. To match this growth in content, hardware components, including disk drives, servers, and communication links, must be upgraded and expanded constantly. In many circumstances, hardware and software alike are strained nearly to the limits of their capabilities. Although new hardware provides additional capacity to meet the storage and processing demands users may impose, the addition of new hardware often disrupts how users interact with the content the users typically access. Typically, some existing content will be moved to the new hardware, and therefore, a change in how users access the existing content after the move may be required.

For example, private content, such as a single user's email, calendar, and tasks, usually is stored on a single server, but is subject to being moved. Often, the email accounts on a server operating near capacity will be divided between two servers. Moving mailboxes presents a problem because users who were accessing one server must now access another. If users explicitly had requested their email from one server, they now must remember to request email explicitly from a different server. For example, if a user accesses email using hypertext transfer protocol "HTTP", the uniform resource locator "URL" must reflect the name of the new server. Alternatively, a user's email software may need to be reconfigured so that it reflects the new location of email storage.

A further problem email users may experience when their mailbox is moved from one server to another is related to caching. Often, mailbox data is cached at the user's local machine. The cache is linked to the user's mailbox so that changes in the mailbox data may be reflected in the cache. Likewise, if a user works offline for a time, changes made locally are queued up so that when the user is reconnected, the local changes will be reflected at the user's mailbox. This synchronization of the user's local machine and mailbox storage is a relatively quick process because only changes are transmitted, rather than the entire content of the mailbox. The increased performance from caching is particularly noticeable over slow communication links. However, moving a user's mailbox may invalidate the user's local cache, and require a complete exchange of mailbox data to reconcile differences between the local cache and server mailbox data. A similar problem exists for any content cached on a user's local machine that is subject to being moved from one server to another, such as calendaring data, task data, etc.

In order to isolate users from the movement of content between servers, some systems provide a front-end server and a back-end server. The front-end server receives requests for content and performs the content formatting required for sending the content to the client system making the content request. The front-end server requests content from the back-end server as the content is needed. However, these prior art systems suffer from at least two significant problems. First, applications must be custom written to take advantage of the division between front-end processing and back-end content storage. Second, the front-end server includes content that is vulnerable to attack because the front-end server is directly accessible by client systems making requests for content. If the front-end server is comprised, all content stored or cached at the front-end server is compromised. Furthermore, by being directly accessible, the front-end servers are subject to denial-of-service style attacks that are relatively common on the Internet.

The management of storage and processing hardware is compounded by the number of users accessing the content a server provides. Some content may be specific to a particular user, such as email, calendars, and tasks. Other content is shared among a group of users who collaborate on various projects or on day-to-day work assignments. Even without collaboration, content may be accessed by a large number of individual users. For example, contact data, standard forms, discussion groups, scheduling applications, etc., all may have a substantial number of individual users.

In other prior art implementations, front-end and back-end servers also may be useful in providing access to public content (i.e., content that is not specific to any particular user, like software or discussion groups). The content is replicated across a number of back-end servers and the front-end server routes requests for the content to the back-end servers as the requests are received. One significant problem with this approach is that the same content must be stored at each of the back-end servers. No allowance is made for customized or selective replication.

For example, front-end routing may include a geographical component so that users requesting content in one area are routed to a particular back-end server for that area. If a discussion group is dedicated to a local topic that is of little or no relevance outside of the area, the discussion group content nevertheless is replicated to all back-end servers. Moreover, because content is replicated across all back-end servers, the content is assumed to be available at all back-end servers. As a result, if a problem occurs at one back-end server, an error will be reported to the client that the content is unavailable, even though the request could have been routed to another back-end server after the error condition occurred. Therefore, the prior art lacks methods and computer program products for effectively using a front-end server to access content stored on one or more back-end servers.

SUMMARY OF THE INVENTION

These and other problems with the prior art are overcome by the present invention, which is directed toward using a front-end server to access content stored on one or more back-end servers. The front-end server acts as an agent or proxy for the client. No content is stored at the front-end server, but the front-end server receives requests for content that are generated by a client system, locates a back-end server that stores the content, routes the request to that back-end server, and returns the requested content back to the client system.

The front-end server has access to a global catalog that dynamically tracks the availability of content at the back-end servers. By examining the client system request and the global catalog, the front-end server identifies one or more back-end servers that appear to be capable of fulfilling the client system's request for content. For request of private content that is stored by only one back-end server, the front-end server identifies the one back-end server that contains the content. Public content (content that is not specifically directed to any particular user) may be stored on multiple back-end servers. The front-end server identifies a list of the back-end servers when public content is stored on multiple servers. Then, using an authentication token associated with authentication credentials supplied by the client system, the front-end selects one of the servers in the list.

In one implementation, the front-end selects a back-end server from the list by using the authentication token as a key to a hash operation performed on the list. This provides at for a given client system making a request for the same content each time the content is requested. As a result, any user-specific status information that is stored with the requested content will be available to the client system for each request. Furthermore, as back-end servers are added or removed from service, the hash operation automatically distributes subsequent requests over the back-end servers that are available at the time of the request. For some users, any user-specific status information will be lost because they will be directed to a different back-end server than they have typically accessed.

The front-end server also checks the validity of requests for content. Invalid requests are rejected to prevent denial of service attacks directed at the back-end servers. In a denial of service attack, a rogue computer swamps the system under attack with invalid requests. Certain invalid requests can require a substantial amount of processing. Eventually, the system under attack spends all of it time attempting to process the invalid requests and is unable to perform any other operations. Unable to keep up with the demands placed on it, the system under attack ultimately crashes with potentially severe consequences. Because the front-end server does not store any content, a denial of service attack presents a relatively minor threat.

Furthermore, the front-end server provides an additional level of security to the back-end servers. A hacker gaining access to the front-end server does not gain access to any content and therefore may not make any malicious changes to content. This is in contrast to prior art systems where front-end servers store content and are vulnerable to having the content modified by someone breaking into the front-end servers.

The present invention provides clients with a single front-end server for accessing content, where the content may move from one back-end server to another. Because clients access back-end servers through the front-end server, the front-end server hides any change in the location of content, providing users with a consistent server name for requesting content. The consistent name for requesting content is a significant benefit to client systems because it allows for changes in content location without invalidating content that is cached locally on the client system. Furthermore, users are not required to change requests for content to match the back-end server location where the content is stored.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
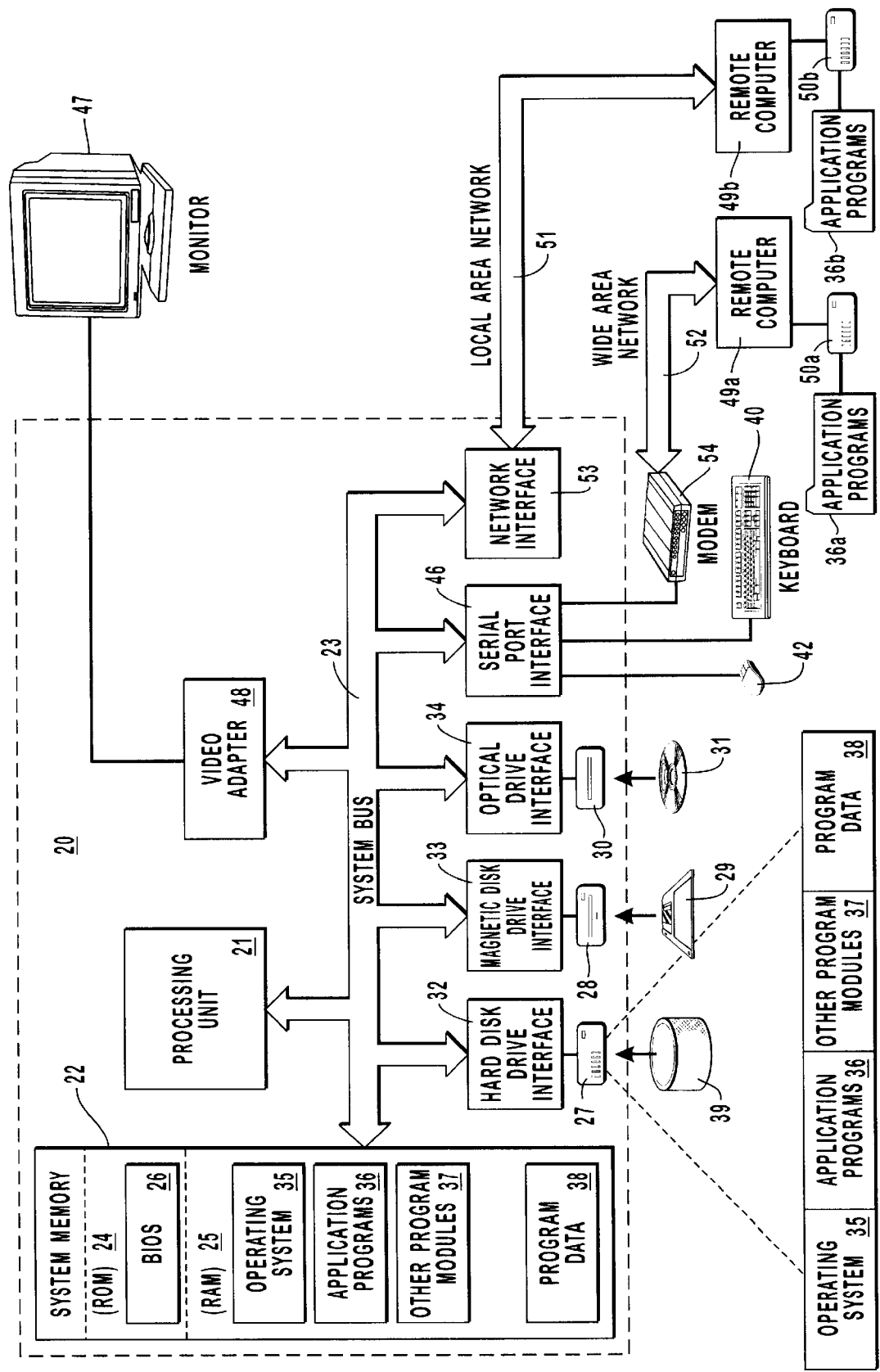
FIG. 1 illustrates an exemplary system that provides a suitable operating environment for the present invention.

With the increasing storage and processing demands placed on server hardware, from time to time content is moved from one server to another. Perhaps mailbox storage is depleted on a server and another server is introduced to accommodate future expansion. Other types of content are stored on multiple servers. For example, an application or discussion group may be present on multiple servers to enhance the accessibility of the content. Based on the popularity of this public content, it may be necessary to alter the number of servers where the content may be accessed, increasing the number of servers for popular or particularly demanding content and reducing the number of servers for less popular or less demanding content.

The present invention makes the specific location of content irrelevant to a client system. All requests for content are directed to a front-end server that examines the request and determines which back-end servers are able to provide the requested content. Information about what content is available at the various back-end servers is stored in a general catalog. For private content that is specific to a user, such as email content, the general catalog identifies the single server that stores the private content. For public content, such as applications, or other content stored in public folders, the general catalog identifies all servers that store the public content. Where multiple servers store the public content, the front-end server has a list of servers from which to choose. The global catalog is updated constantly so that the information it contains accurately reflects the servers where content is available at the time a request is made.

In the case where a list of servers is available for providing the requested content, the front-end server directs requests from various clients to each of the servers in a balanced manner. In one embodiment, an authentication token associated with authentication credentials received from the client system is used as a key to a hashing operation that the front-end server performs on the list of servers. The hash operation evenly distributes requests over all available servers and directs a particular client to the same server each time a given request is made (assuming the number of available servers does not change).

The front-end server also checks the validity of requests received from client systems. Validity analysis allows the front-end server to protect the back-end servers from denial of service attacks that may be instigated over the Internet. A denial of service attack is based on the idea that certain invalid requests are time consuming to process. By flooding a server with many invalid requests, the server is unable to perform its normal processing and is likely to crash. However, because the front-end server does not contain any content, denial of service attacks are of relatively minor concern when compared to the possibility that a back-end server may be subject to attack.

The lack of content stored at the front-end provides an additional level of security because comprising the front-end does not give an attacker access to content that will be sent to clients. In contrast, prior art servers storing content provide attackers with the ability to alter content and effect the overall stability of the system. Breaking into a front-end server according to the present invention represents a security breach, but only at the highest level, allowing time for the intruder to be detected prior to reaching back-end servers where content is stored.

By accessing content through a front-end server according to the present invention, clients are able to access content using a naming convention that does not change as the location of content changes from one server to another. This allows client systems to maintain valid caches because the source of the content appears to remain constant. Further, client systems are not required to reconfigure email software or alter request formats to conform with where back-end servers currently store content. The present invention extends to both methods and computer program products for using a front-end server to access content stored on one or more back-end servers. The embodiments of the present invention may comprise a special purpose or general purpose computer including various computer hardware. These embodiments are discussed in greater detail below. However, in all cases, the described embodiments should be viewed a exemplary of the present invention rather than as limiting it's scope.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
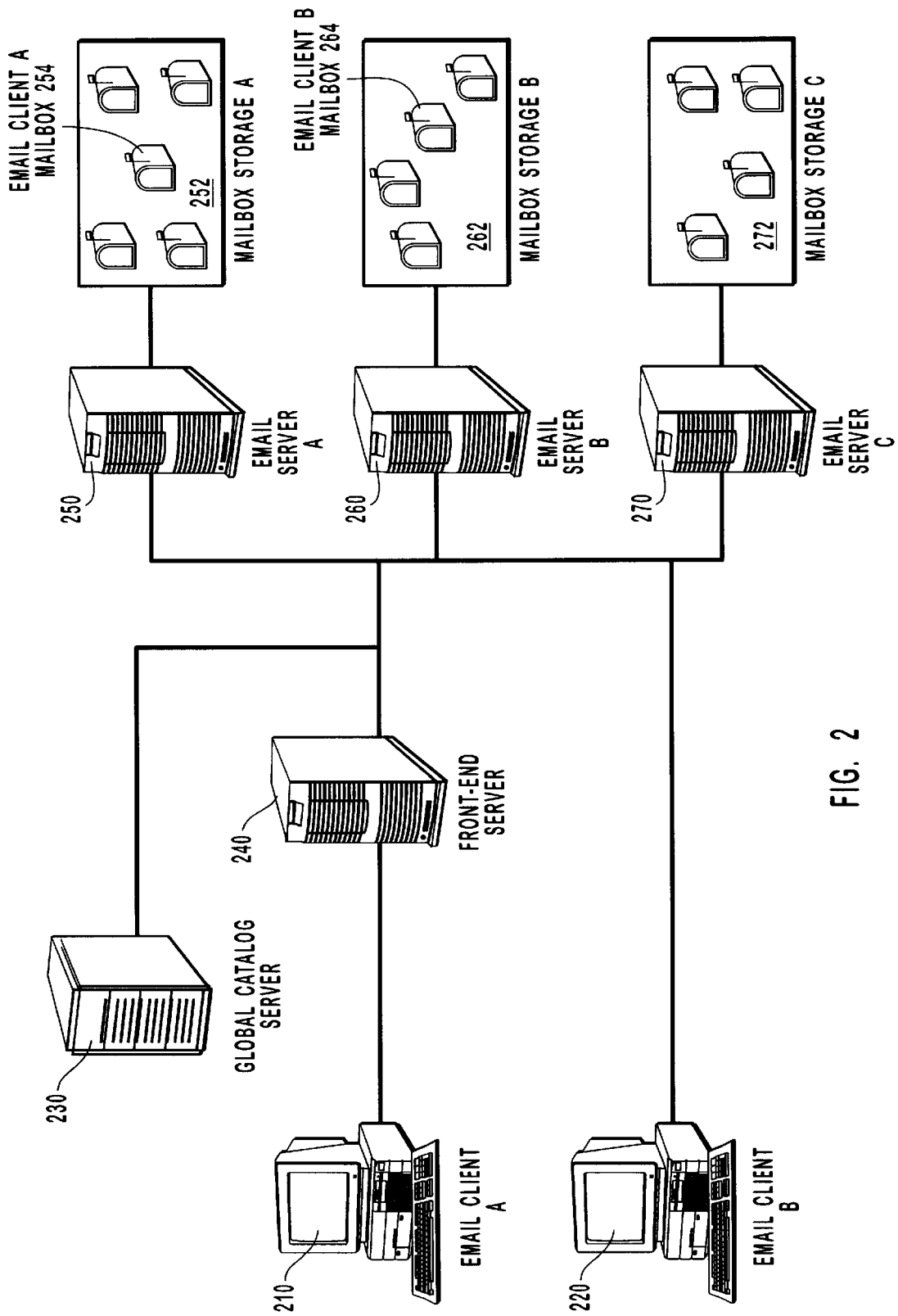
FIG. 2 shows two client systems accessing email content stored at back-end servers.

FIG. 2 shows two separate client systems accessing email content stored at back-end servers. Email server A 250 includes mailbox storage A 252 containing email client A mailbox 254. Similarly, Email server B 260 includes mailbox storage B 262 containing email client B mialbox 264. Email server C 270 includes mailbox storage C 272. Email server A 250, email server B 260, and email server C 270 are examples of back-end servers. Email client A mailbox 254 and email client B mailbox 264 are examples of resources available through front-end server 240. Global catalog server 230 provides front-end server 240 with current information regarding the content stored at each of the available back-end servers. Additionally, the front-end server 240 is stateless and does not require, for example, a hard drive for storing program data. U.S. application Ser. No. 09/680,120, filed on the same day herewith, and entitled "Selecting a Server to Service Client Requests," which is hereby incorporated by reference, provides greater detail with respect to how a particular back-end server may be identified and how a front-end server operates.

Email client A 210 uses front-end server 240 in accessing email content, whereas email client B 220 does not. One reason that email client B 220 does not request content through front-end server 240 is that the email client B 220 may use a protocol that is incompatible with front-end server 240. For example, messaging application programming interface ("MAPI") is a protocol that currently will not allow front-end server 240 to route requests for a client system. Nevertheless, this demonstrates that the present invention does not preclude direct access to back-end servers. Email client B 220 requests the content of email client B mailbox 264 stored in mailbox storage 262 of email server 260.

In contrast, email client A 210 uses a protocol that allows front-end server 240 to route content requests for a client system. Internet message access protocol 4 ("IMAP4"), post office protocol version 3 ("POP3"), and hypertext transfer protocol ("HTTP") are all protocols that front-end server 240 can direct to a particular back-end server on behalf of email client A 210. The present invention is not limited to any particular protocol. It is only necessary that the protocol allow for requests to be routed by a front-end server.

Comparing requests for content by email client A 210 to requests for content by email client B 220 may be helpful in understanding the present invention. Assume that both client systems use HTTP as their email protocol. A request by email client B 220 for the contents of the email client B mailbox 264 might be entered as "http://serverB/exchange/clientB" and a request by email client B 220 for the contents of the email client A mailbox 254 might be entered as "http://serverA/exchange/clientA". Note that in each case, it was necessary to specify the server where the mailbox contents were stored. In contrast, if the front-end server 240 were named "mail" a request by email client A 210 for the contents of the email client A mailbox 254 might be entered as "http://mail/exchange/clientA" and a request by email client A 210 for the content of the email client B mailbox 264 might be entered as "http://mail/exchange/clientB".

Email client A 210 does not know and does not care what back-end server stores the requested email content. If the email content is moved to a different back-end server, front-end server 240 will direct the request to the appropriate back-end server. However, email client B 220 is unable to access email content without knowing the name of the back-end server where the email content is stored. Those of skill in the art will recognize that any caching email client A 210 maintains will remain valid independent of the particular back-end server storing the email content because to email client A 210, it appears as if front-end server 240 is the source. In contrast, any movement of email content accessed by email client B 220 will invalidate a local cache because the moved content will appear to be new and the cached content will have no source with which to synchronize.

The foregoing requests by email client A 210 are explicit requests for the contents of a specific mailbox. As long as email client A 210 has permissions to access the contents of email client B mailbox 240, the request will be honored. Alternatively, it is possible to make implicit requests for mailbox content. For example, a request entered as "http://mail/exchange/" is an implicit request because no particular mailbox is identified. The specific mailbox may be implied, however, from authentication credentials provided by email client A 210. If the authentication credentials for email client A 210 are given, it will be implied that the contents of email client A mailbox 254 are being requested. Likewise, if the authentication credentials for email client B 220 are given, it will be implied that the contents of email client B mailbox 264 are being requested. Those of skill in the art will recognize that authentication credentials vary depending on the protocol used in making content requests. HTTP provides for basic and digest authentication. Both HTTP authentication schemes include a username that can be appended to the request so that a specific resource is requested. Nevertheless, the present invention is in no way limited to any particular authentication credentials. Front-end server 240 also may include any authentication credentials received from a client system with requests directed to a back-end server. In doing so, the front-end server 240 satisfies the authentication requirements imposed by a back-end server for accessing the content stored at the back-end server.

The HTTP requests show examples of resource identifiers. Depending on the protocol used, resource identifiers may be altered as they move from a client system to a front-end server and from a front-end server to a back-end server. The implicit requests described above illustrate one way in which resource identifiers may be modified. HTTP requests that are sent to a server may have the host name portion of the resource identifier removed. For example, "http://www.companyA.com/mail/exchange/" becomes "GET/mail/exchange". The host name may be implied by the fact that a particular host received the request or headers included with the request may identify the host that was entered as part of the request. Those of skill in the art will recognize that each protocol for requesting content from a back-end server will provide some type of resource identifier to specify the content being requested. The term resource identifier should be interpreted broadly to encompass each of the above examples as well as the resource identifiers that are available in other protocols.

Figure 3:
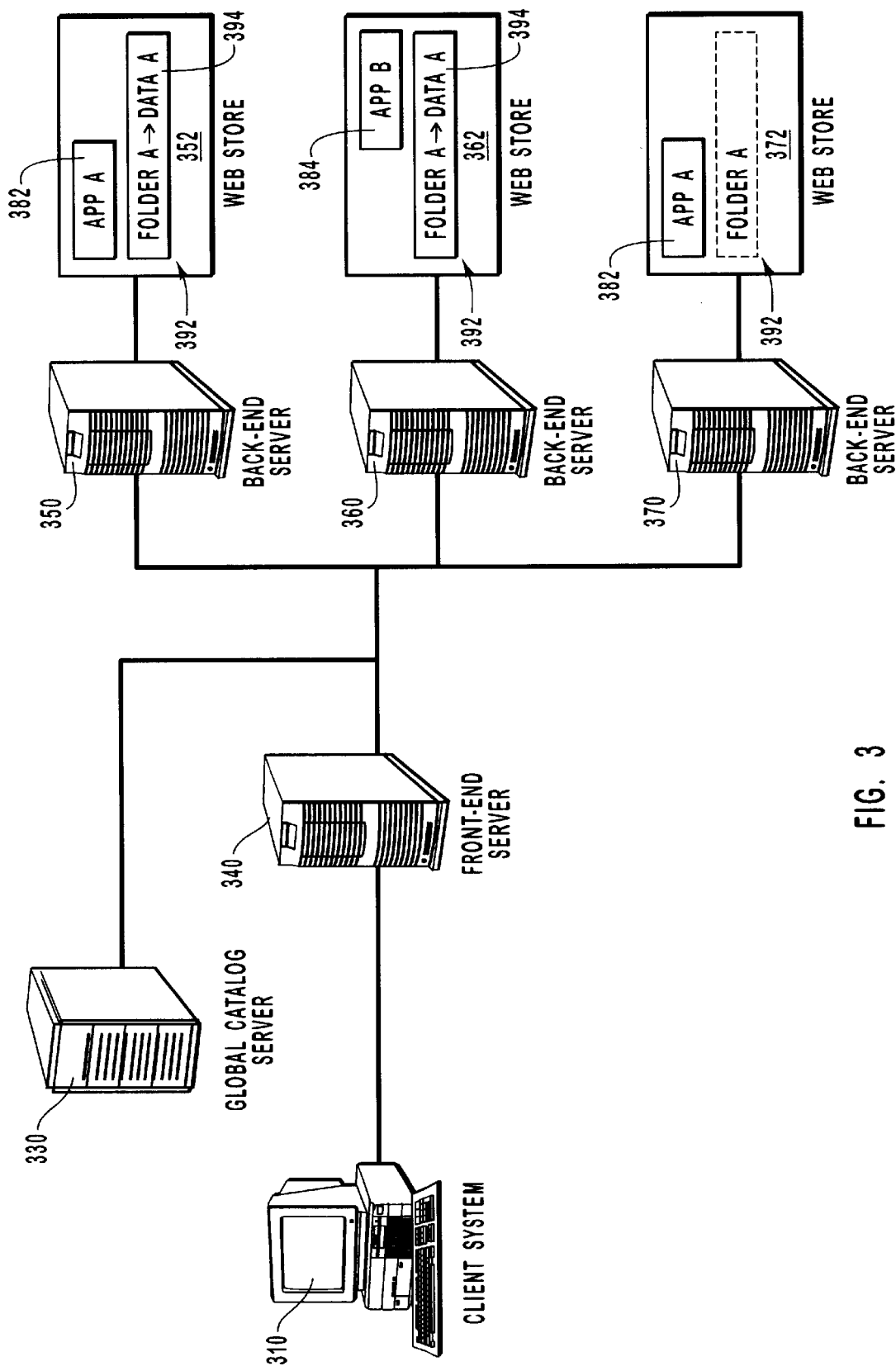
FIG. 3 show a client system accessing content that is stored at various back-end servers through a front-end server.

Just as the present invention is not limited to any particular protocol, it is not limited to any particular content. FIG. 3 shows client system 310 using front-end server 340 to access content that is stored at various back-end servers. Back-end server 350 includes web store 352 containing App A 382 and Folder A 392 that stores Data A 394. Back-end server 360 includes web store 362 containing App B 384 and Folder A 392 that stores Data A 394. Back-end server 370 includes web store 372 containing App A 382 and Folder A 392. However, Folder A 392 is dashed in web store 372 to indicate that the storage hierarchy is present at back-end server 370, but the data (e.g., Data A 394) is not.

App A 382, App B 384, and Folder A 392 are examples of public content stored at a back-end server. App A 382 is available in web stores 352 and 372, whereas App B 384 is only available in web store 362. Folder A 392 represents a storage hierarchy for organizing public content. Microsoft Exchange ® products allow the determination of whether data corresponding to a folder will be stored on a particular server to be made on a folder-by-folder basis. Folder A 392 in web store 372 is set not to store any data. One reason for not storing the data for a folder is that the folder may be of minor significance for the users of a particular server. Because the folder is seldom if ever accessed, it is better to conserve the storage space that would otherwise be required for storing the folder's contents.

Nevertheless, by including the hierarchy on each server, it is possible to access the contents of each folder on any server. A request for the contents of Folder A 392 made to web store 372 will result in a response that indicates where the contents of Folder A 392 may be accessed. Most likely, the access will be slower than would be provided by access to web store 372 because lower bandwidth communication links may be used, but this added burden is a minor imposition given the relative infrequency of access to Folder A 392 at back-end server 370. A folder within the storage hierarchy that does not include the folder's contents is said to be "ghosted."

When client system 310 requests App A 382 from front-end server 340, global catalog server 330 identifies a list of servers that includes back-end server 350 and back-end server 370. Front-end server 340 uses an authentication token associated with authentication credentials received from client system 310 as a key for performing a hashing operation over the list of servers. The hashing operation insures that requests for content are evenly distributed over the servers where the content is available and that a given request and authentication token will identify the same server each time the request is made (as long as the available servers do not change). By requesting data from the same back-end server each time a given request is made, any user-specific state information may be stored and recalled at the back-end server, such as a read/unread state for messages in a public folder. Authentication tokens and authentication credentials may be stored in global catalog server 330 and/or cached in front-end server 340.

Client system 310 requesting App B 384 from front-end server 340, identifies a single server, back-end server 360, from global catalog server 330. Like the mailbox examples from FIG. 2, no hashing operation occurs because the data may only be requested from one back-end server. Thus, for both public and private content, it is possible that the hashing operation will not be necessary to identify a particular server where the content request is directed.

Global catalog server 330 identifies back-end server 350, back-end server 360, and back-end server 370, in response to a request for the contents of Folder A 392 from front-end server 340. If the hashing operation identifies back-end server 350 or back-end server 360, the request is directed to the identified back-end server as described above. But, if back-end server 370 is identified, front-end server 340 must perform additional work in order to direct the request to a back-end server that can satisfy the request because the requested content is ghosted. When front-end server 340 directs the request to back-end server 370, back-end server 370 generates a redirect response. The contents of the redirect response depend on whether or not front-end 340 has modified the request to indicate that the response is from a front-end server. If so, the redirect response includes a list of back-end servers that can satisfy the request for the ghosted folder. Otherwise, the redirect response includes a single back-end server capable of satisfying the request. U.S. application Ser. No. 09/680,120, filed on the same day herewith, and entitled "Selecting a Server to Service Client Requests," which is hereby incorporated by reference, and U.S. application Ser. No. 09/679,71, filed on the same day herewith, and entitled "Transparently redirecting Client Requests for Content," which is hereby incorporated by reference, provide additional information on identifying a back-end server when public content is ghosted on a back-end server.

Figure 4:
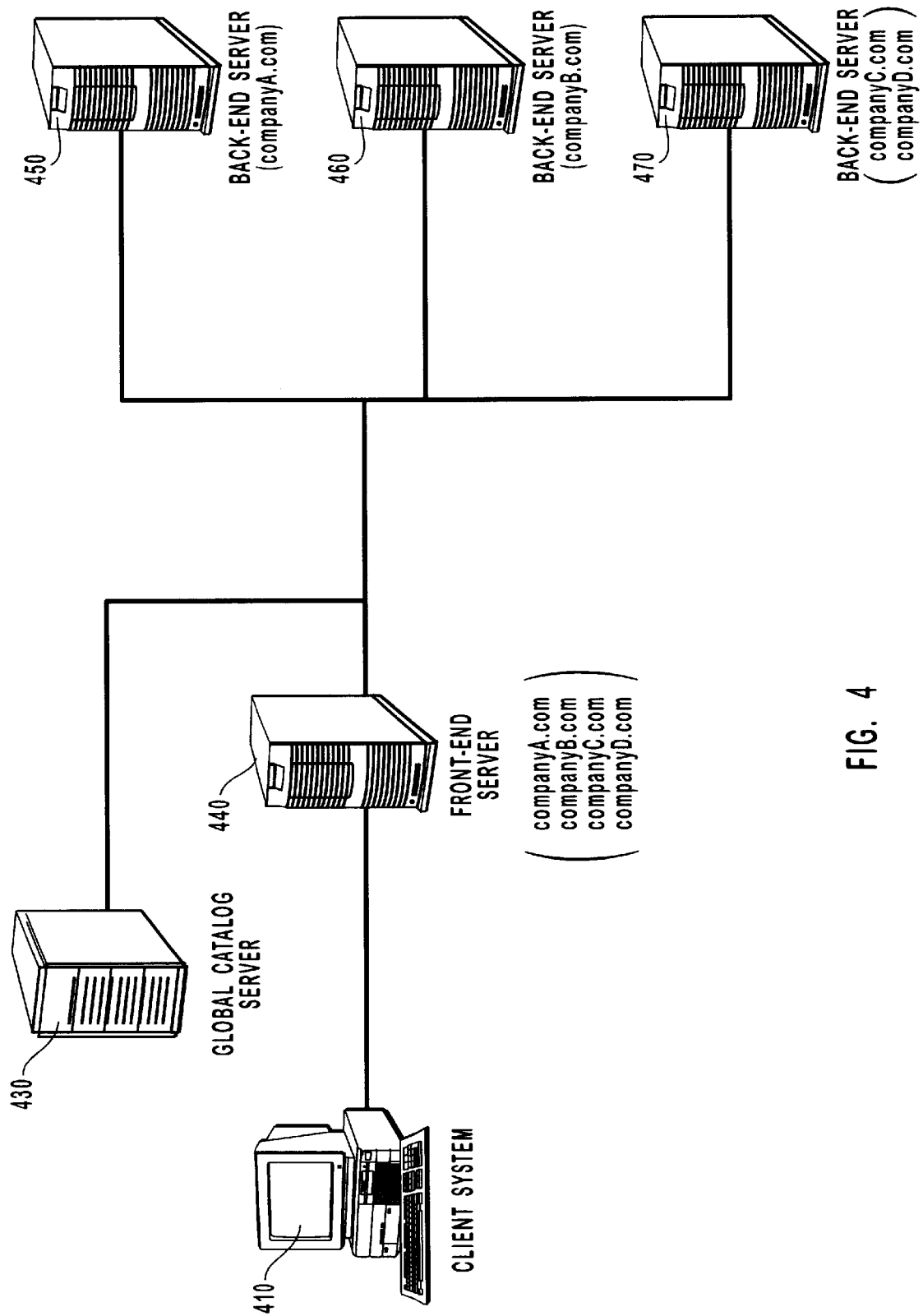
FIG. 4 shows a front-end server operating as part of a hosting system.

FIG. 4 shows a front-end server operating as part of a hosting system. Front-end server 440 receives request for data from client system 410 that are directed to companyA.com, companyB.com, companyC.com, and companyD.com, all of which have corresponding back-end servers. Content for companyA.com is located on back-end server 450. Content for companyB.com is located on back-end server 460. Content for companyC.com and companyD.com is located on back-end server 470. Global catalog server 430 identifies the corresponding back-end server for each of the hosted sites. It should be noted that the features described with reference to FIGS. 2, 3, and 4, are not exclusive of each other and may be combined to meet the requirements of a particular system.

Figure 5A:
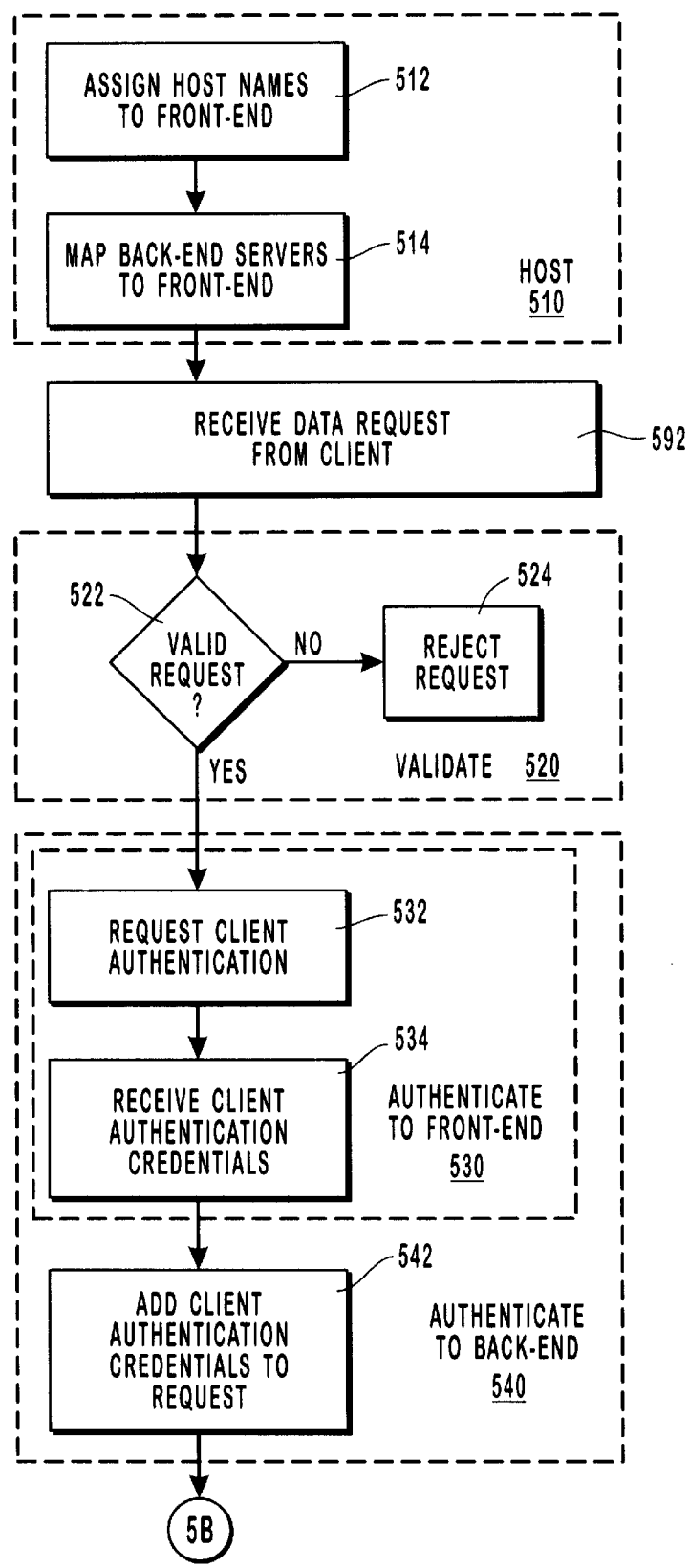
FIGS. 5A and 5B are flowcharts illustrating exemplary methods for accessing content stored at a back-end server according to the present invention.
Figure 5B:
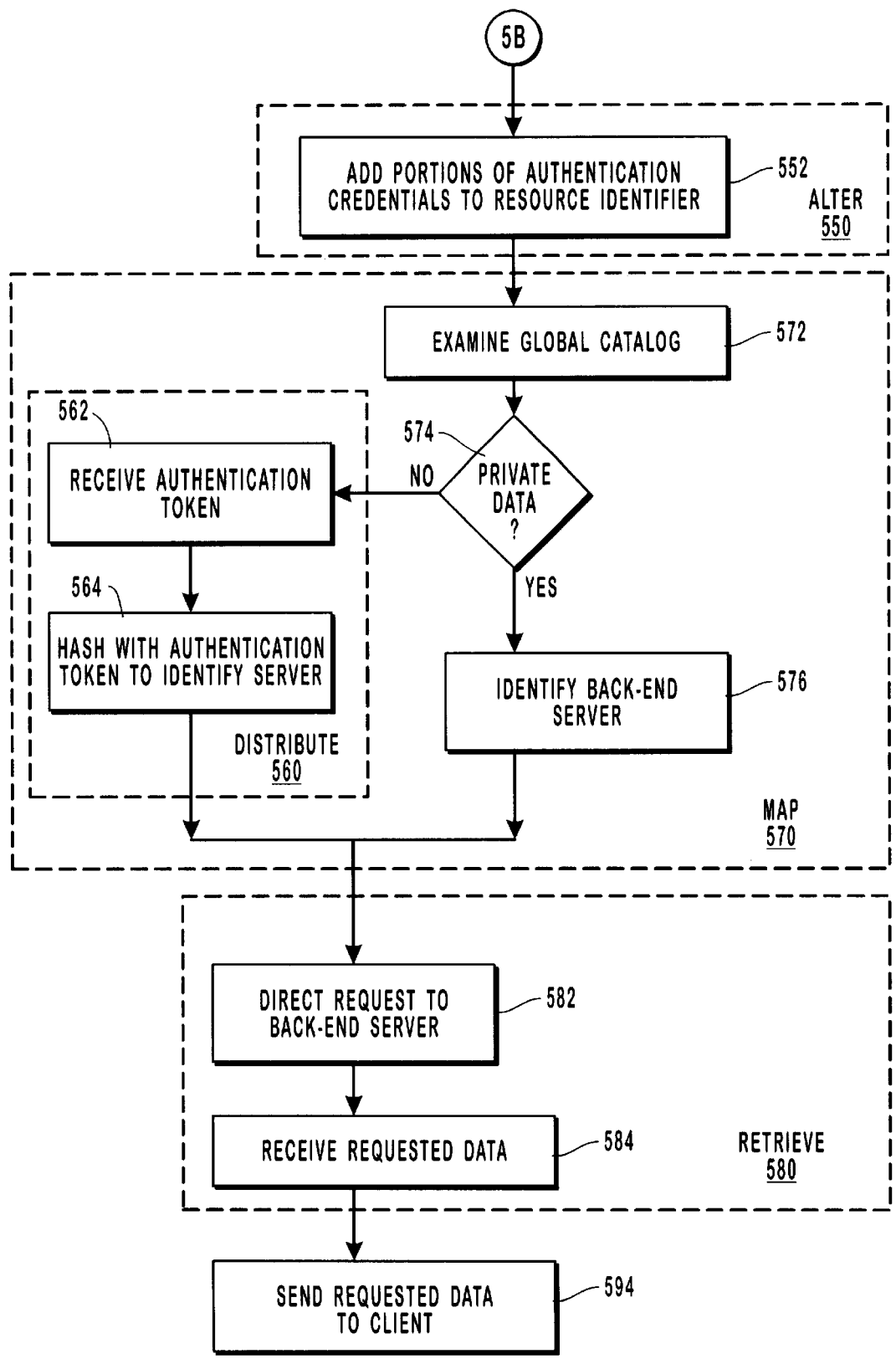

FIGS. 5A and 5B are flowcharts illustrating exemplary methods for accessing content stored at a back-end server according to the present invention. At block 512, host names are assigned to the front-end server. Then, back-end servers are mapped to the host names assigned to the front-end server (514). The act of assigning host names to the front-end server and mapping back-end servers to the host names assigned to the front-end server are enclosed in a dashed line to indicate that they are examples of acts that may occur within a step for hosting (510) a plurality of back-end servers.

At block 592, the front-end server receives a request for content from a client system. After receiving the request, the front-end checks to see if the request is valid in decision block 522. If not, the request is rejected (524). A step for validating a request (520) may include the acts of checking for a valid request and rejecting the request if it is invalid.

With a valid request, the front-end server requests client authentication (532). In response, the front-end receives proper authentication credentials back from the client system (534). In order to satisfy authentication requirements of the back-end servers, the client authentication credentials are added, in block 542, to the request. Requesting client authentication and receiving authentication credentials back from the client system are examples of acts that may occur within a step for authenticating the client system to the front-end (530). Those acts along with the act of adding client authentication credentials to the request are examples of acts that may occur within a step for authenticating the client system to the back-end (540). Alternatively, if the front-end does not include authentication, the back-end may request and received client authentication directly (not shown).

The act of adding portions of the authentication credentials to a resource identifier (552) is an act that may occur as part of a step for altering the resource identifier (550) based on the step for authenticating the client system. A step for altering also may include use of the authentication token associated with authentication credentials to alter the resource identifier such that it identifies a specific resource. The request may be altered further to indicate that a front-end server is making the request on behalf of a client system (not shown).

A step for mapping a received request to a particular back-end server (570) may include the act of examining the global catalog (572). If the request is for private content (e.g., email, etc.), determined in decision block 574, an act of identifying a particular back-end server follows (576). Otherwise, the request is for public content, such as an application or data that is not directed to a specific user. Assuming that multiple back-end servers store the requested content, the step for mapping may include a step for distributing the request (560) to a particular back-end server based on the client system authentication. Included within the step for distributing are the acts of receiving an authentication token (562) that is associated with the authentication credentials and hashing the list of multiple servers with the authentication token to identify the particular back-end server (564).

With the particular back-end server identified, the front-end server directs the request to the particular back-end server (582). In response, the front-end receives the requested content back from the particular back-end server (584). The acts of directing the request to a particular back-end server and receiving the requested content from the back-end server are examples of acts that may occur during a step for retrieving the requested content (580). Once the content is received from the back-end server, the front-end server performs the act of sending the requested content to the client system (594).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computerized system that includes a client system, a front-end server, and one or more back-end servers, all interconnected with a communication link, a method of accessing content stored at a particular back-end server such that the client system does not know which of the one or more back-end servers store the content, the method comprising the front-end server performing the acts of:

receiving a request for the content from the client system, the request including a resource identifier that references the front-end server and the content being requested by the client system;

examining a global catalog that dynamically maps the resource identifier to a plurality of back-end servers storing the requested content;

identifying a particular back-end server storing the requested content, from the plurality of back-end servers mapped to the resource identifier in the global catalog, wherein the same particular back-end server is identified for a given request over time, as long as the same particular back-end server is available and stores the content being requested; and directing the request to the particular back-end server.

2. A method as recited in claim 1 further comprising the acts of:

receiving the requested content from the particular back-end server; and sending the requested content to the client system.

3. A method as recited in claim 1 further comprising the act of rejecting the request if the request is invalid.

4. A method as recited in claim 1 wherein the content is specific to a user at the client system and is stored only at the particular back-end server.

5. A method as recited in claim 4 further comprising the acts of:

requesting authentication credentials from a user at the client system;

receiving proper authentication credentials from the user at the client system; and adding at least a portion of the authentication credentials to the resource identifier so that the resource identifier is limited to a user associated with the authentication credentials.

6. A method as recited in claim 5 wherein the content is email content.

7. A method as recited in claim 1 further comprising the acts of:

requesting authentication credentials from a user at the client system who initiated the request for content; and receiving proper authentication credentials from the user at the client system.

8. A method as recited in claim 7 wherein the particular back-end server requires user authentication, the method further comprising the act of including the user authentication credentials with the request for content directed to the particular back-end server.

9. A method as recited in claim 7 further comprising the acts of:

receiving from the global catalog an authentication token associated with the authentication credentials; and using the authentication token as a key for a hash operation to identify the particular back-end server.

10. A method as recited in claim 7 further comprising the acts of:

receiving a subsequent request for the content from the client system, the request including the same resource identifier as the prior request;

examining the global catalog; and identifying the same particular back-end server that was identified for the prior request.

11. A method as recited in claim 7 further comprising the acts of:

receiving a subsequent request for the content from the client system, the request including the same resource identifier as the prior request;

examining the global catalog; and identifying a different back-end server from the particular back-end server identified for the prior request because the particular back-end server is either unavailable or no longer stores the requested content.

12. A method as recited in claim 1 wherein the front-end server is part of a hosting system and is identified by a plurality of server names, and wherein the global catalog dynamically maps resource identifiers referencing the front-end server based at least in part on a server name portion of the resource identifier.

13. A method as recited in claim 1 wherein the client system communicates with the front-end server using at least one of hypertext transfer protocol, post office protocol, and internet message access protocol.

14. In a computerized system that includes a client system, a front-end server, and one or more back-end servers, all interconnected with a communication link, a method of accessing content stored at a particular back-end server such that the client system does not know which of the one or more servers store the content, the method comprising the front-end server performing the acts of:
   receiving a request for the content from the client system, the request including a resource identifier that references the front-end server and the content being requested by the client system;
   checking the request to insure that the request is a valid request;
   examining a global catalog that dynamically maps resource identifiers to the one or more back-end servers storing the content;
   identifying a particular back-end server storing the requested content based on the mappings in the global catalog, wherein the same particular back-end server is identified for a given request over time, as long as the same particular back-end server is available and stores the content being requested; and
   directing the request to the particular back-end server.

15. A method as recited in claim 14 further comprising the acts of:
   requesting authentication credentials from the client system; and
   receiving proper authentication credentials from the client system.

16. A method as recited in claim 15 wherein the one or more back-end servers require user authentication, the method further comprising the act of including the user authentication credentials with the request for content directed to the particular back-end server.

17. A method as recited in claim 15 further comprising the acts of:
   receiving from the global catalog an authentication token associated with the authentication credentials; and
   using the authentication token as a key for a hash operation to identify the particular back-end server.

18. A method as recited in claim 14 wherein the content is Web content.

19. A method as recited in claim 18 further comprising the acts of:
   receiving a subsequent request for the content from the client system, the request including the same resource identifier as the prior request;
   examining the global catalog; and
   identifying the same particular back-end server that was identified for the prior request.

20. In a computerized system that includes a client system, a front-end server, and one or more back-end servers, all interconnected with a communication link, a method of accessing content stored at a particular back-end server such that the client system does not know which of the one or more back-end servers store the content, the method comprising the front-end server performing:
   an act of receiving a request for the content from the client system, the request including a resource identifier that references the front-end server and the content being requested by the client system;
   a step for mapping a request received from the client system to a particular one of a plurality of back-end servers that store the requested content, wherein a given request maps to the same particular back-end server over time, as long as the same particular back-end server is available and stores the content being requested;
   a step for retrieving the requested content from the particular back-end server; and
   an act of sending the requested content to the client system.

21. A method as recited in claim 20 further comprising a step for validating the request.

22. A method as recited in claim 20 further comprising a step for authenticating the client system.

23. A method as recited in claim 22 further comprising a step for altering the resource identifier based on the step for authenticating the client system.

24. A method as recited in claim 22 further comprising a step for distributing the request to the particular back-end server based on the client system authentication.

25. A method as recited in claim 20 further comprising a step for authenticating the client system to the particular back-end server.

26. A method as recited in claim 20 wherein the content comprises at least one of Web or email content.

27. A method as recited in claim 20 further comprising a step for hosting a plurality of back-end servers.

28. For a computerized system that includes a client system, a front-end server, and one or more back-end servers, all interconnected with a communication link, a computer program product for implementing a method of accessing content stored at a particular back-end server such that the client system does not know which of the one or more back-end servers store the content, comprising:
   a computer readable medium for carrying machine-executable instructions for implementing the method; and
   wherein said method is comprised of machine-executable instructions for performing the acts of:
      receiving a request for the content from the client system, the request including a resource identifier that references the front-end server and the content being requested by the client system;
      examining a global catalog that dynamically maps the resource identifier to a plurality of back-end servers storing the content;
      identifying a particular back-end server storing the requested content, from the plurality of back-end servers mapped to the resource identifier in the global catalog, wherein the same particular back-end server is identified for a given request over time, as long as the same particular back-end server is available and stores the content being requested; and
      directing the request to the particular back-end server.

29. A computer program product as recited in claim 28 wherein the method is comprised further of machine-executable instructions for performing the acts of:
   receiving the requested content from the particular back-end server; and
   sending the requested content to the client system.

30. A computer program product as recited in claim 28 wherein the method is comprised further of machine-executable instructions for performing the act of rejecting the request if the request is invalid.

31. A computer program product as recited in claim 28 wherein the method is comprised further of machine-executable instructions for performing the acts of:

requesting authentication credentials from the client system; and receiving proper authentication credentials from the client system.

32. A computer program product as recited in claim 31 wherein the method is comprised further of machine-executable instructions for performing the act of adding at least a portion of the authentication credentials to the resource identifier so that the resource identifier is limited to a user associated with the authentication credentials.

33. A computer program product as recited in claim 31 wherein the one or more back-end servers require client system authentication, and wherein the method is comprised further of machine-executable instructions for performing the act of including the client authentication credentials with the request for content directed to the particular back-end server.

34. A computer program product as recited in claim 31 wherein the method is comprised further of machine-executable instructions for performing the acts of:

receiving from the global catalog, an authentication token associated with the authentication credentials; and using the authentication token as a key for a hash operation to identify the particular back-end server.

35. A computer program product as recited in claim 28 wherein the front-end server is part of a hosting system and is identified by a plurality of server names, and wherein the global catalog dynamically maps resource identifiers referencing the front-end server based at least in part on a server name portion of the resource identifier.

36. For a computerized system that includes a client system, a front-end server, and one or more back-end servers, all interconnected with a communication link, a computer program product comprising one or more computer readable media carrying computer executable instructions that implement a method of accessing content stored at a particular back-end server such that the client system does not know which of the one or more servers store the content, the method comprising the front-end server performing the acts of:

receiving a request for the content from the client system, the request including a resource identifier that references the front-end server and the content being requested by the client system;

checking the request to insure that the request is a valid request;

examining a global catalog that dynamically maps resource identifiers to the one or more back-end servers storing the content;

identifying a particular back-end server storing the requested content based on the mappings in the global catalog, wherein the same particular back-end server is identified for a given request over time, as long as the same particular back-end server is available and stores the content being requested; and directing the request to the particular back-end server.

37. A computer program product as recited in claim 36, the method further comprising acts of:

requesting authentication credentials from the client system; and receiving proper authentication credentials from the client system.

38. A computer program product as recited in claim 37 wherein the one or more back-end servers require user authentication, the method further comprising the act of including the user authentication credentials with the request for content directed to the particular back-end server.

39. A computer program product as recited in claim 37, the method further comprising the acts of:

receiving from the global catalog an authentication token associated with the authentication credentials; and using the authentication token as a key for a hash operation to identify the particular back-end server.

40. A computer program product as recited in claim 36 further comprising the acts of:

receiving a subsequent request for the content from the client system, the request including the same resource identifier as the prior request;

examining the global catalog; and identifying the same particular back-end server that was identified for the prior request.

* * * * *